US008423920B2

(12) United States Patent
Lee et al.

(10) Patent No.: US 8,423,920 B2
(45) Date of Patent: Apr. 16, 2013

(54) METHOD OF FORMING PHOTOMASK BY COLLECTING VERIFICATION DATA BASED ON A LAYOUT OF CONTOUR PATTERNS

(75) Inventors: Eun-Mi Lee, Yongin-si (KR); Chun-Suk Suh, Yongin-si (KR); Sung-Woo Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 5 days.

(21) Appl. No.: 13/167,949

(22) Filed: Jun. 24, 2011

(65) Prior Publication Data

US 2012/0005635 A1 Jan. 5, 2012

(30) Foreign Application Priority Data

Jul. 2, 2010 (KR) ........................ 10-2010-0063870

(51) Int. Cl.
*G06F 17/50* (2006.01)
*G06F 9/455* (2006.01)

(52) U.S. Cl.
USPC .................. 716/51; 716/50; 716/53; 716/54; 716/55; 716/111; 700/121

(58) Field of Classification Search ........................ None
See application file for complete search history.

(56) References Cited

U.S. PATENT DOCUMENTS

| | | | | |
|---|---|---|---|---|
| 6,038,020 | A * | 3/2000 | Tsukuda | 356/237.5 |
| 7,796,801 | B2 * | 9/2010 | Kitamura et al. | 382/141 |
| 8,307,310 | B2 * | 11/2012 | Kotani et al. | 716/51 |
| 2012/0300054 | A1 * | 11/2012 | Mito et al. | 348/79 |

FOREIGN PATENT DOCUMENTS

| | | | |
|---|---|---|---|
| JP | 2009-194051 | A | 8/2009 |
| KR | 10-0702794 | B1 | 3/2007 |
| KR | 10-0798246 | B1 | 1/2008 |

* cited by examiner

*Primary Examiner* — A. M. Thompson
(74) *Attorney, Agent, or Firm* — Lee & Morse, P.C.

(57) ABSTRACT

A method of forming a photomask includes providing a layout of design patterns, setting an optical proximity correction (OPC) with respect to the layout of design patterns, and forming a layout of correction patterns with respect to the layout of design patterns by using the set OPC. The method also includes collecting verification data about the layout of correction patterns by using a layout of contour patterns based on the layout of correction patterns, and verifying whether the layout of design patterns and the layout of correction patterns are substantially identical to each other by using the verification data.

20 Claims, 7 Drawing Sheets

METHOD OF FORMING PHOTOMASK BY COLLECTING VERIFICATION DATA BASED ON A LAYOUT OF CONTOUR PATTERNS

CROSS-REFERENCE TO RELATED APPLICATION

Korean Patent Application No. 10-2010-0063870, filed on Jul. 2, 2010, in the Korean Intellectual Property Office, and entitled: "Method of Forming Photomask, Computer-Readable Recording Medium Storing Programmed Instructions for Executing the Method, and Mask Imaging System," is incorporated by reference herein in its entirety.

BACKGROUND

The development of photolithography technology is one of the advancements used in the scaling down of integrated circuits. A method of verifying patterns obtained by, e.g., using an optical proximity correction (OPC) process, may be used in the process of forming the integrated circuits.

SUMMARY

Embodiments may be realized by providing a method of forming a photomask, the method including providing a layout of design patterns, setting an optical proximity correction (OPC) with respect to the layout of design patterns, forming a layout of correction patterns with respect to the layout of design patterns by using the set OPC, collecting verification data about the layout of correction patterns by using a layout of contour patterns of the layout of correction patterns, and verifying whether the layout of design patterns and the layout of correction patterns are substantially identical to each other by using the verification data.

The collecting of the verification data may include extracting the layout of contour patterns from the layout of correction patterns, selecting one contour pattern from the layout of contour patterns, splitting the selected contour pattern into a plurality of segments having a predetermined size, measuring widths of the contour patterns to provided measured widths, the measuring of the widths of the contour patterns including measuring a width of the selected contour pattern with respect to the plurality of segments, and forming the verification data, the verification data including the measured widths of the contour patterns.

The measuring of the widths of the contour patterns may include selecting one segment from the plurality of segments as a reference segment, setting a gradient of a tangent line of the reference segment as a reference gradient, calculating gradients of tangent lines of other segments of the plurality of segments based on the reference gradient, and measuring the width of at least the selected contour pattern with respect to ones of the plurality of segments according to the calculated gradients of the segments.

The width of at least the selected contour pattern may be measured with respect to the ones of the plurality of segments having the same absolute values of gradients as the reference gradient.

The width of at least the selected contour pattern may be measured with respect to a segment having a tangent line perpendicular to the tangent line of the reference segment.

The width of at least the selected contour pattern may not be measured with respect to the segments having different absolute values of gradients from the reference gradient.

The width of at least the selected contour pattern may be measured with respect to the plurality of segments sequentially in an order in which the plurality of segments are adjacent to the reference segment.

The reference segment may be positioned in a middle of the selected contour pattern. The segments having different gradients from the reference gradient may be positioned on an end of the selected contour pattern.

The method may further include, after the verifying whether the layout of design patterns and the layout of correction patterns are substantially identical to each other, forming a photomask by using the correction patterns if the layout of design patterns and the layout of correction patterns are substantially identical to each other.

The measuring of the widths of the contour patterns may include measuring some of the plurality of segments and not measuring other remaining segments.

The measuring of the widths of the contour patterns may include splitting the plurality of segments into a first segment group and a second segment group, performing measurement of the width of at least the selected contour pattern with respect to the first segment group, and omitting measurement of the width of at least the selected the contour pattern with respect to the second segment group.

The plurality of segments may be split into the first segment group and the second segment group according to their positions.

The segments included in the first segment group may be positioned in a middle of the selected contour pattern.

Some of the segments included in the first segment group may be positioned at ends of the selected contour pattern.

The segments included in the second segment group may be positioned at ends of the selected contour pattern.

The splitting the selected contour pattern included in the layout of the contour patterns into the plurality of segments may be performed prior to the measuring of widths of the contour patterns, which in turn may be performed prior to the forming the verification data.

The verifying whether the layout of design patterns and the layout of correction patterns are substantially identical to each other may be performed by comparing widths of patterns included in the layout of design patterns and widths of patterns included in the layout of correction patterns.

Embodiments may also be realized by providing a computer-readable recording medium storing programmed instructions for executing a method of forming a photomask on a computer, the method including providing a layout of design patterns, setting an optical proximity correction (OPC) with respect to the layout of design patterns, forming a layout of correction patterns with respect to the layout of design patterns by using the set OPC, collecting verification data about the layout of correction patterns by using a layout of contour patterns based on the layout of correction patterns, and verifying whether the layout of design patterns and the layout of correction patterns are substantially identical to each other by using the verification data.

Embodiments may also be realized by providing a system for performing a method of forming a photomask, the system including a providing mechanism that provides a layout of design patterns, a setting mechanism that sets an optical proximity correction (OPC) with respect to the layout of design patterns, a forming mechanism that forms a layout of correction patterns with respect to the layout of design patterns by using the set OPC, a collecting mechanism that collects verification data about the layout of correction patterns by using a layout of contour patterns of the layout of correction patterns, and a verifying mechanism that verifies whether the layout of design patterns and the layout of correction patterns are identical to each other by using the verification data.

Embodiments may also be realized by providing a method for verifying patterns for a photomask prior to forming the photomask having the patterns, the method of verifying the patterns including collecting verification data about a layout of correction patterns by using a layout of contour patterns based on the layout of correction patterns, and verifying whether a layout of design patterns and the layout of correction patterns are substantially identical to each other by using the verification data.

BRIEF DESCRIPTION OF THE DRAWINGS

Features become apparent to those of ordinary skill in the art by describing in detail exemplary embodiments with reference to the attached drawings, in which.

DETAILED DESCRIPTION

Figure 1:
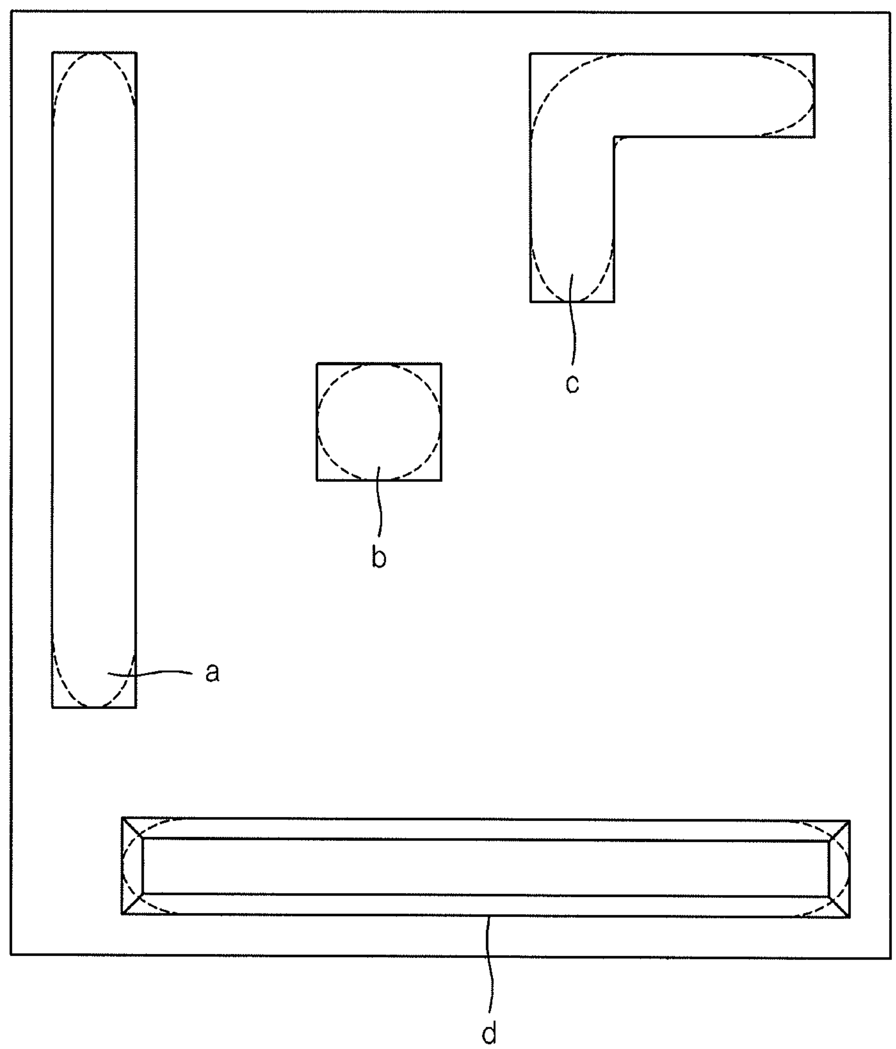
FIG. 1 illustrates a schematic view of a layout of design patterns and a layout of correction patterns, according to an exemplary embodiment.

Reference will now be made in detail to exemplary embodiments, examples of which are illustrated in the accompanying drawings. However, exemplary embodiments are not limited to the embodiments illustrated hereinafter, and the embodiments herein are rather introduced to provide easy and complete understanding of the scope and spirit of exemplary embodiments. In the drawings, the thicknesses of layers and regions are exaggerated for clarity.

It will be understood that when an element, such as a layer, a region, or a substrate, is referred to as being "on," "connected to" or "coupled to" another element, it may be directly on, connected, or coupled to the other element or intervening elements may be present. In contrast, when an element is referred to as being "directly on," "directly connected to," or "directly coupled to" another element, there are no intervening elements present. Like reference numerals refer to like elements throughout. As used herein, the term "and/or" includes any and all combinations of one or more of the associated listed items.

It will be understood that, although the terms first, second, third, etc., may be used herein to describe various elements, e.g., components, regions, layers and/or sections, these elements should not be limited by these terms. These terms are only used to distinguish the element from another element. Thus, a first element discussed below could be termed a second element without departing from the teachings of exemplary embodiments.

Spatially relative terms, such as "above," "upper," "beneath," "below," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "above" may encompass both an orientation of above and below. The device may be otherwise oriented, e.g., rotated 90 degrees or at other orientations, and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, e.g., integers, steps, operations, elements, and/or components, but do not preclude the presence or addition of one or more other features.

Exemplary embodiments are described herein with reference to cross-sectional illustrations that are schematic illustrations of exemplary embodiments (and intermediate structures). As such, variations from the shapes of the illustrations as a result, e.g., of manufacturing techniques and/or tolerances, are to be expected. Thus, exemplary embodiments should not be construed as limited to the particular shapes of regions illustrated herein but to include deviations in shapes that result, e.g., from manufacturing. For example, an implanted region illustrated as a rectangle may have rounded or curved features and/or a gradient of implant concentration at its edges rather than a binary change from implanted to non-implanted region. Thus, the regions illustrated in the figures are schematic in nature and their shapes may not be intended to illustrate the actual shape of a region and may not be intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a schematic view of a layout of design patterns and a layout of correction patterns, according to an exemplary embodiment.

Referring to FIG. 1, the layout of design patterns may include various patterns formed therein. For example, the layout of design patterns may include, e.g., at least one of a line pattern a, a contact pattern b, a corner pattern c, and a slot pattern d. In FIG. 1, the line pattern a, the contact pattern b, the corner pattern c, and the slot pattern d have a particular shape. However, FIG. 1 illustrates the layout of design patterns just as an example for convenience of explanation. Embodiments are not limited by FIG. 1, e.g., the embodiments are not limited to the shape, the number, or the arrangement illustrated in FIG. 1.

When the layout of correction patterns is formed by performing, e.g., optical proximity correction (OPC), on the layout of design patterns, end portions of at least one of the correction patterns and the design patterns may be curved. According to an exemplary embodiment, the end portions of the correction patterns in the layout of correction patterns may be curved. Exemplary curved portions are indicated by dotted lines in FIG. 1. Although the layout of design patterns and the layout of correction patterns are not completely identical to each other due to, e.g., the curved portions, this is an error, e.g., an inevitable error, that may occur in a process of manufacturing a photomask. Further, it may not be possible to perform a verification process on the curved portions so that the photomask may be efficiently and economically manufactured. Thus, according to exemplary embodiments discussed below, the verification process may not be performed, i.e., the verification process may be excluded, in some regions corresponding to the curved portions of the correction patterns.

The layout of correction patterns may be formed using the OPC process. The OPC process may be a model-based OPC process that includes, e.g., applying only one model to a full-chip, or a rule-based OPC process that includes, e.g., applying one kind of rule to a full-chip.

In the model-based OPC process, a mask having a predetermined number of test patterns, e.g., a small number that represents a fraction of a total number of patterns allowed for design, may be formed. A test substrate may be formed using the mask having the predetermined test patterns. An OPC model, which may also be referred to as a kernel or process model, for expressing a transfer process in consideration of an OPC effect may be formed based on the result of measuring lengths of the test patterns formed over the test substrate. A difference between the shapes of the test patterns of the mask and the shapes of the test patterns transferred onto the test substrate may be determined by a simulation using the OPC model. The test patterns of the mask may be corrected based on the results of the simulation using the OPC model.

In the rule-based OPC process, a mask having test patterns indicating all patterns allowed for design may be formed. The test patterns of the mask may be transferred onto a substrate, and the substrate may be etched to form a test substrate. A design rule for changing information about design of the test patterns of the mask, e.g., a rule-based OPC, may be preformed based on length measurement information about shapes of the test patterns of the test substrate and information about design of the test patterns of the mask. Then, the test patterns of the mask may be corrected based on the rule-based OPC process.

The OPC process, e.g., the model-based OPC process and the rule-based OPC process, may be performed in consideration of an effect factor of an optical model and an effect factor of a photoresist model. The effect factor of the optical model may change the intensity and shape of light until light that has passed through the mask reaches a wafer, by adjusting information about light irradiated from a light source. For example, the effect factor of the optical model may be at least one of a numeric aperture, a wavelength, the type and size of an opening, and the like. The effect factor of the photoresist model may be modeled, e.g., relatively predictably modeled, due to the development of a relatively large number of experiments and modeling methods.

Figure 2:
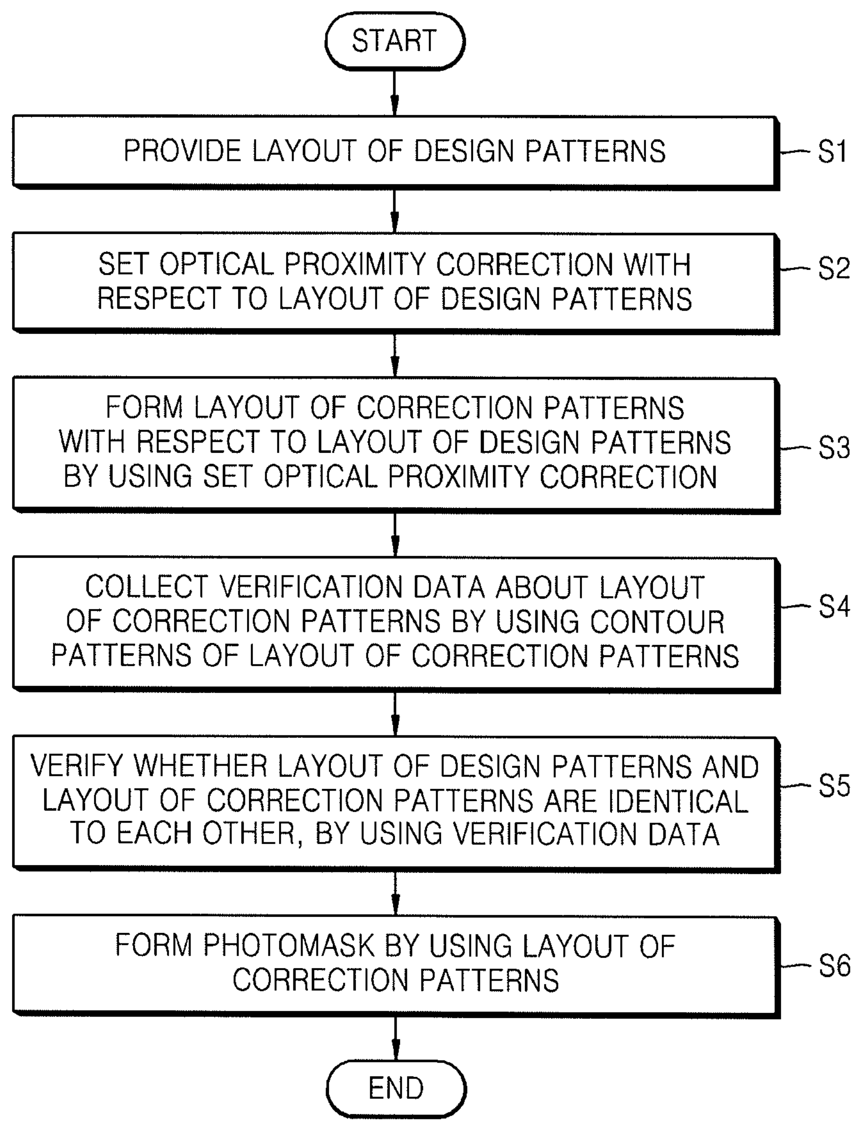
FIG. 2 illustrates a flowchart of a method of forming a photomask, according to an exemplary embodiment.

FIG. 2 illustrates a flowchart of a method of forming a photomask, according to an exemplary embodiment.

Referring to FIG. 2, the method of forming a photomask, according to an exemplary embodiment, may include Operations S1-S6. The Operation S1 of forming the photomask may include providing a layout of design patterns. The Operation S2 of forming the photomask may include setting a correction with respect to the layout of design patterns provided in Operation S1. For example, the correction may be an OPC, i.e., optical proximity correction. The Operation S3 of forming the photomask may include forming a layout of correction patterns on the layout of design patterns by using the OPC set in Operation S2. The Operation S4 of forming the photomask may include collecting verification data about the layout of correction patterns formed in Operation S3 by using a layout of contour patterns of the layout of correction patterns. The layout of contour patterns may include the different outlines of patterns formed in the layout of correction patterns. The Operation S5 of forming the photomask may include verifying whether the layout of design patterns is substantially identical and/or identical to the layout of correction patterns, by using the verification data collected in Operation S4. In Operation S6, the photomask may be formed by using the layout of correction patterns.

In the process of forming a photomask, e.g., in Operation S5, determining whether the layout of design patterns is substantially identical and/or identical to the layout of correction patterns may not be limited to shapes and dimensions of the patterns, or the like being substantially completely and/or completely physically identical to each other. In this regard, verifying the layout of design patterns with respect to the layout of correction patterns may include a case where given conditions, e.g., minimum conditions, are satisfied. For example, the given conditions may be satisfied when shapes, widths, lengths of the patterns, and/or the like are within allowable tolerances, and this is applied to the present specification throughout. Therefore, verifying whether the layout of the design patterns are substantially identical and/or identical to the layout of correction patterns may allow for conditions that are within allowable tolerances, e.g., allowable tolerances of a difference in shape, width, and/or length of the patterns The Operation S5 may be performed by comparing widths, e.g., along a length direction and along a width direction, of patterns included in the layout of design patterns with widths of patterns included in the layout of correction patterns. The widths of patterns including in the layer of design patterns may be set within a predetermined range. The widths of the patterns included in the layout of correction patterns may be measured by collected data with respect to the correction patterns.

The method of forming a photomask may further include, after determining that the layout of design patterns is substantially identical and/or identical to the layout of correction patterns, forming a photomask by using the layout of correction patterns. For example, after performing the Operation S5, which may include verifying whether the layout of design patterns is substantially identical and/or identical to the layout of correction patterns by using the verification data, when the layout of design patterns and the layout of correction patterns are found to be substantially identical and/or identical to each other, the Operation S6 of forming the photomask by using the correction patterns may be performed.

After performing the Operation S5, if the layout of design patterns and the layout of correction patterns are found to not meet the allowable conditions, i.e., are found to not be substantially identical and/or identical to each other, the patterns may be corrected. For example, correcting of the layout of design patterns and providing corrected layout of design patterns may be performed. Thereafter, the method may be performed again starting with Operation S2, as discussed above, after providing the corrected layout of design patterns. Alternatively, by resetting OPC and providing the reset OPC, the method may be performed again from Operation S3 of forming the layer of correction patterns, as described above. According to an exemplary embodiment, the process, e.g., Operations S2-S5, may be repeated until the layout of design patterns and the layout of correction patterns are found to meet the allowable conditions, i.e., are verified as substantially identical and/or identical to each other.

Figure 3:
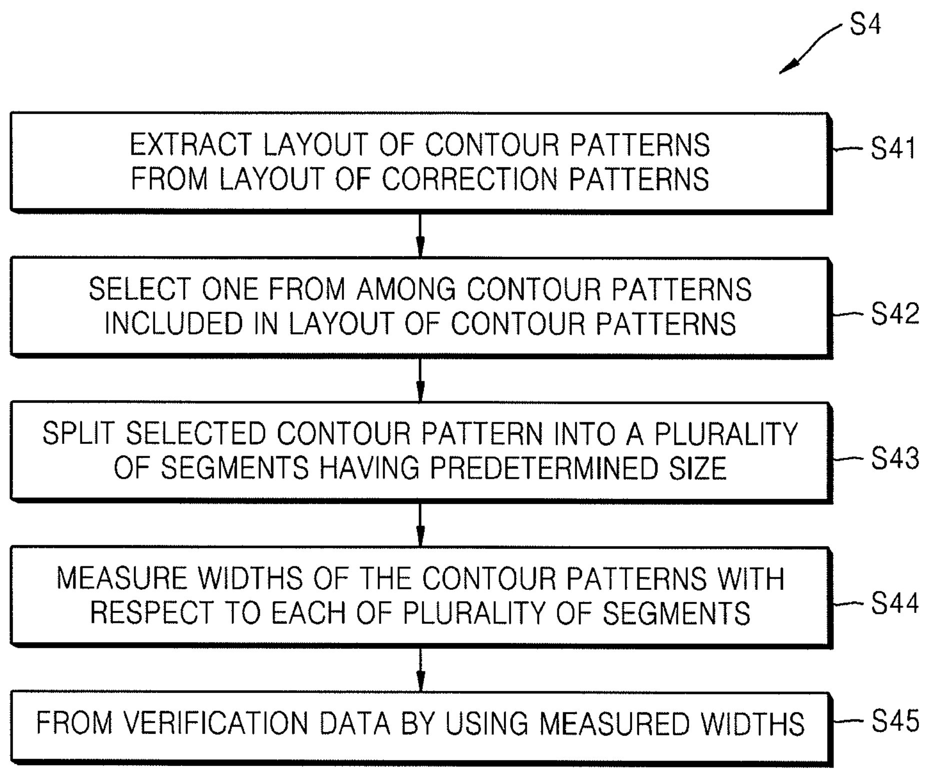
FIG. 3 illustrates a flowchart of an exemplary operation of collecting verification data included in the method of forming a photomask illustrated in FIG. 2.

FIG. 3 illustrates a flowchart of an exemplary operation of collecting verification data included in the method of forming the photomask illustrated in FIG. 2.

Referring to FIG. 3, the Operation S4 of collecting the verification data, according to an exemplary method of forming the photomask, may include at least Operations S41-S45. The Operation S41 may include extracting the layout of contour patterns from the layout of correction patterns. The Operation S42 may include selecting one from among the contour patterns included in the layout of contour patterns. The Operation S43 may include splitting the selected contour pattern into a plurality of segments having a predetermined size. The Operation S44 may include measuring widths of the contour patterns, e.g., the widths of all the contour patterns and/or the widths of the selected contour pattern, with respect to each of the plurality of segments and/or some of the plurality of segments. The Operation S45 may include forming the verification data by using the widths, e.g., measurements along a length direction and along a width direction, of the contour patterns measured in the Operation S44. The verification data may then be used in the Operation S5, as illustrated in FIG. 2, to verify whether the layout of design patterns and the layout of correction patterns are substantially identical and/or identical to each other.

The splitting the contour patterns included in the layout of contour patterns into a plurality of segments in the Operation S43, the measuring of the widths of the contour patterns in the Operation S44, and the forming of the verification data in the Operation S45 may be respectively and/or sequentially performed. As a result, the verification data may be formed with respect to the contour patterns included in the layout of contour patterns. For example, the verification data may be formed with respect to each of the contour patterns included in the layout of contour patterns. According to an exemplary embodiment, the Operation S43 to the Operation S45 may be repeated a plurality of times and, e.g., each time a different contour pattern from among the contour patterns may be selected and/or each time another contour pattern will be selected so that the operations are repeated for each contour pattern extracted from the layout of correction patterns.

The Operation S44, which may include the measuring of the widths of the contour patterns, may be performed on some of the plurality of segments and may not be performed on the other remaining segments. This will be described with reference to FIGS. 4 and 5 in detail.

Figure 4:
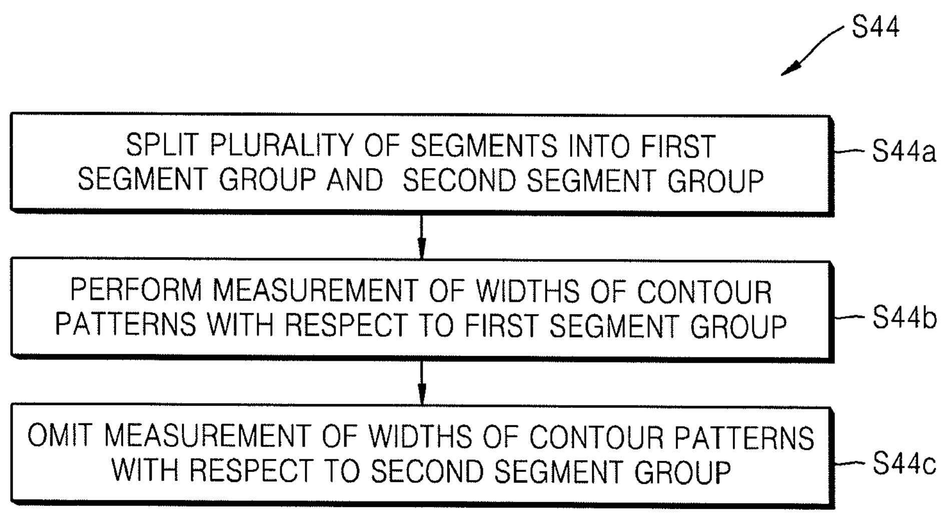
FIG. 4 illustrates a flowchart of an operation of measuring widths of contour patterns included in the method of forming a photomask illustrated in FIG. 3, according to an exemplary embodiment.

FIG. 4 illustrates a flowchart of an operation of measuring widths of contour patterns included in the method of forming a photomask illustrated in FIG. 3, according to an exemplary embodiment.

Referring to FIG. 4, the Operation S44, which may include measuring the widths of the contour patterns with respect to the plurality of segments, may include Operations S44*a*-S44*c*. The Operation S44*a* may include splitting the plurality of segments into a first segment group and a second segment group. The Operation S44*b* may include measuring the widths of the contour patterns with respect to the first segment group. The Operation S44*c* may include not measuring the widths of the contour patterns with respect to the second segment group.

The plurality of segments may be split into the first segment group and the second segment group according to their positions. For example, at least some of the segments included in the first segment group may be positioned in the middle of the contour patterns. Some of the segments included in the first segment group may be positioned at ends of the contour patterns. The segments included in the second segment group may be positioned at the ends of the contour patterns. For example, a center portion of the curved end portion of the contour pattern 3 may be included in the first segment group and the remaining portions of the curved end portion of the contour pattern 3 may be included in the second segment group.

Figure 5:
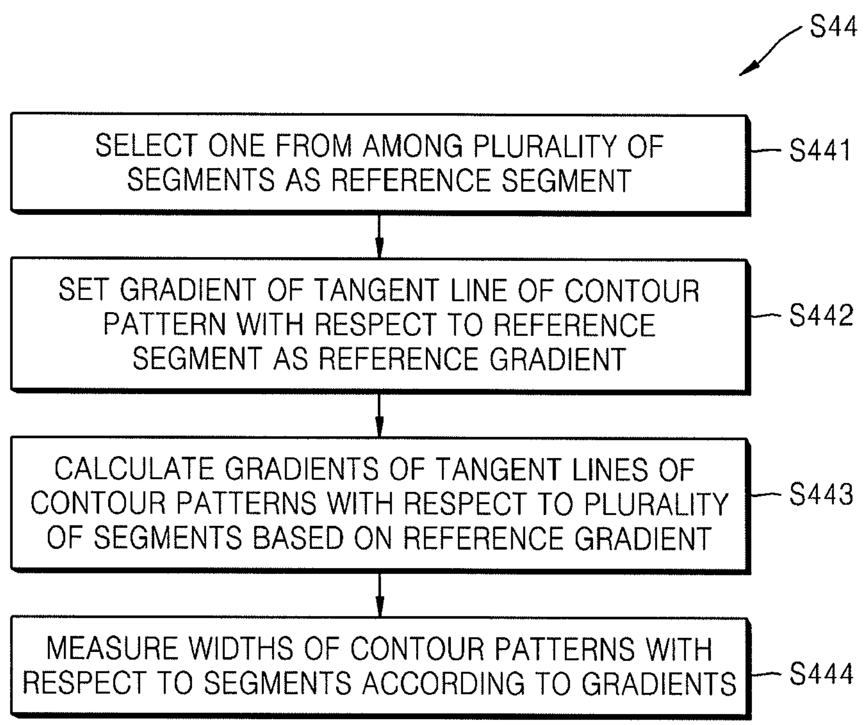
FIG. 5 illustrates a flowchart of an exemplary operation of measuring widths of contour patterns included in the method of forming a photomask illustrated in FIG. 3, according to an exemplary embodiment.

FIG. 5 illustrates a flowchart of an exemplary operation of measuring widths of contour patterns included in the method of forming a photomask illustrated in FIG. 3, according to an exemplary embodiment. The flowchart illustrated in FIG. 5 is an exemplary method of performing the measurement of widths of contour patterns, e.g., at least the width of the selected contour pattern, with respect to the flowchart illustrated in FIG. 4.

Referring to FIG. 5, the Operation S44, which may include measuring the widths of the contour patterns with respect to some of and/or each of the plurality of segments, may include Operations S441-S444. The Operation S441 may include selecting one from among the plurality of segments as a reference segment. The Operation S442 may include setting a gradient of a tangent line of the selected contour pattern with respect to the reference segment section in Operation S441 as a reference gradient. The Operation S443 may include calculating gradients of tangent lines of the contour patterns with respect to the plurality of segments, e.g., each of the plurality of segments, based on the reference gradient set in the Operation S442. The Operation S444 may include measuring widths of the contour patterns with respect to the segments according to the gradients calculated in the Operation S443. The Operation S444 may include measuring at least a width, e.g., a width along the length direction or a width along the width direction, of at least the selected contour pattern with respect to ones of the plurality of segments.

The widths of the contour patterns may be measured with respect to the segments having the same gradients as the reference gradient. On the other hand, the widths of the contour patterns may not be measured with respect to the segments having different gradients from the reference gradient. When the segments have different gradients from the reference gradient, the widths of the contour patterns may be measured with respect to the segments having tangent lines perpendicular to tangent lines of the contour patterns with respect to the reference segment. For example, the segments having the same gradients as the reference gradient may form the first segment group, e.g., in the Operation S44*a*, as illustrated in FIG. 4. The segments having the same gradients as the reference gradient may be used to measure the width of the contour pattern along the width direction. Further, some of the segments having different gradients from the reference gradient may form the second segment group. The segments having different gradients from the reference gradient that have tangent lines perpendicular to the tangent lines of the reference segment may be used to measure the width of the contour pattern along the length direction.

The widths of the contour patterns may be measured with respect to the plurality of segments sequentially, e.g., sequentially in the order in which the plurality of segments are arranged adjacent to the reference segment. For example, the widths of the contour patterns may be measured in an order starting from the segment, of the plurality of segments, that is adjacent to the reference segment. The reference segment may be positioned in the middle of the contour patterns. The segments having different gradients from the reference gradient may be positioned at ends of the contour patterns, e.g., along the curved end portions of the contour patterns.

FIGS. 6 through 9 illustrate views of an operation of measuring a width of an exemplary contour pattern 3, according to an exemplary embodiment.

Figure 6:
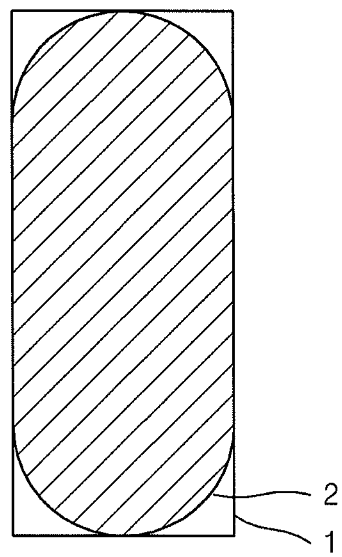
FIGS. 6 through 9 illustrate views of an operation of measuring a width of a contour pattern, according to an exemplary embodiment.

Referring to FIG. 6, an exemplary design pattern 1 and an exemplary correction pattern 2 with respect to the design pattern 1 are illustrated. The design pattern 1 may be included in the layout of design patterns provided in the Operation S1, as illustrated FIG. 2. The correction pattern 2 may be included in the layout of correction patterns formed in the Operation S3, as illustrated in FIG. 2. Thus, the correction pattern 2 may be a pattern corrected from the design pattern 1 by using a set OPC. The correction pattern 2 may be a pattern that is not actually formed on a mask substrate but may be virtually formed within a computer.

Figure 7:
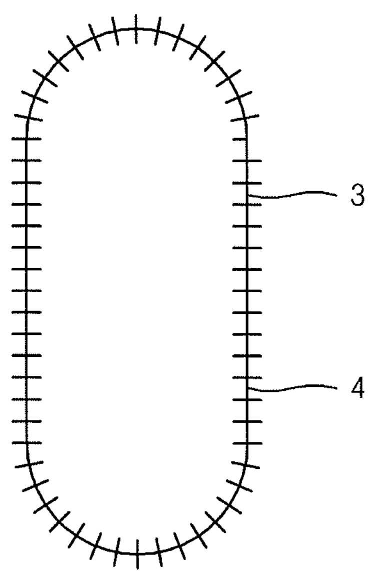

Referring to FIG. 7, the contour pattern 3 may be extracted along a contour of the correction pattern 2. The contour pattern 3 may be included in the layout of the contour patterns extracted from the layout of correction patterns in the Operation S41, as illustrated in FIG. 3. Subsequently, the contour pattern 3 may be split into a plurality of segments 4, e.g., in the Operation S43, as illustrated in FIG. 3. The plurality of segments 4 may have substantially the same and/or the same sizes. This is also just an example, and embodiments are not limited thereto. For example, the plurality of segments 4 may have varying sizes.

Figure 8:
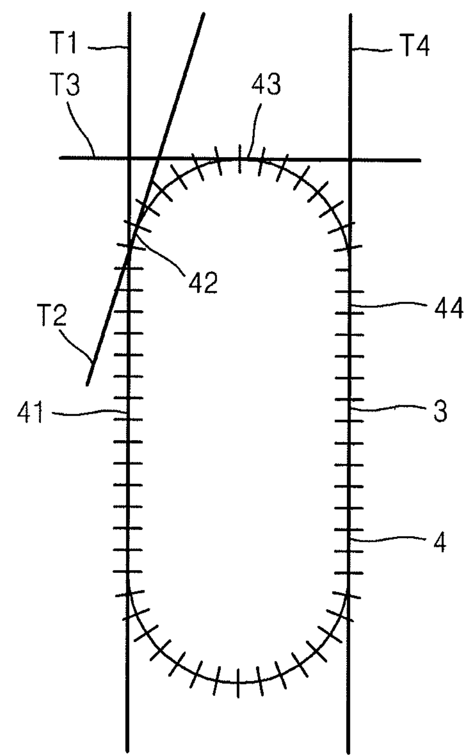

Referring to FIG. 8, according to an exemplary embodiment, one from among the plurality of segments 4 may be selected as a reference segment, e.g., in the Operation S441, as illustrated in FIG. 5. For example, a first segment 41 may be selected as the reference segment. The first segment 41 may be positioned in the center of one side of the contour pattern 3.

Subsequently, a gradient of a tangent line of the contour pattern 3 with respect to the reference segment may be set as a reference gradient, e.g., in the Operation S442, as illustrated in FIG. 5. A gradient of a first tangent line T1 with respect to the first segment 41 may be selected as the reference gradient. A value of the reference gradient may be arbitrarily set with respect to the first tangent line. For example, the value of the reference gradient may be selected to have a value of 0, i.e., to be the same as an x-axis, or to have a value of infinity, e.g., to be the same as a y-axis.

Subsequently, gradients of tangent lines of the contour pattern 3 with respect to the plurality of segments may be calculated based on the reference gradient, e.g., in the Operation S443, as illustrated in FIG. 5. For convenience of explanation, only first through fourth tangent lines T1, T2, T3, and T4 corresponding to the first through fourth segments 41, 42, 43, and 44, respectively, are illustrated in FIG. 8. Referring to FIG. 8, the first tangent line T1 has a different value of a gradient from values of gradients of the second tangent line T2 and the third tangent line T3. On the other hand, the first tangent line T1 has the same absolute value of a gradient as that of the fourth tangent line T4 (namely, + or − symbols are opposite).

Subsequently, the width of the contour pattern 3 may be measured with respect to the segment according to the gradient, e.g., in the Operation S444, as illustrated in FIG. 5. For example, the width of the contour pattern 3 may be measured with respect to the first segment 41. Subsequently, the width of the contour pattern 3 may be measured with respect to the segments having the same gradients, e.g., absolute value of the gradient, of the tangent lines as the gradient of the first tangent line T1 of the first segment 41. The width of the contour pattern 3 may be sequentially measured in the order in which the segments are adjacent to the first segment 41.

When the contour pattern 3 reaches the second segment 42, the gradient of the tangent line of the segment may be changed. In other words, the gradients of the first tangent line T1 of the first segment 41 and the second tangent line T2 of the second segment 42 may be different from each other, as described above. In this case, the width of the contour pattern 3 with respect to the second segment 2 is not measured. Thus, even when the width of the contour pattern 3 with respect to the second segment 42 is different from a set value, the width is not verified as an error.

When the contour pattern 3 reaches the third segment 43, the third tangent line T3 may be perpendicular to the first tangent line T1. In other words, the gradients of the first tangent line T1 and the third tangent line T3 may be reverse numbers, as described above. In this case, the length of the contour pattern 3, i.e., the width along the length direction, with respect to the third segment 43 may be measured. The length as measured along the length direction of the contour pattern 3 may be perpendicular to the width as measured along the width direction of the contour pattern 3. Measuring the widths of the contour pattern 3 may include measuring both the length along the length direction and the width along the width direction.

Before the contour pattern 3 reaches the fourth segment 44, after the third segment 43, the width of the contour pattern 3 is not measured in the same manner as with respect to the second segment 42.

When the contour pattern 3 reaches the fourth segment 44, the gradient of the fourth tangent line T4 of the fourth segment 44 may be the same as that of the first tangent line T1 as an absolute value. In other words, the gradients of the first tangent line T1 and the fourth tangent line T4 may indicate the same value having only opposite + or − symbols. In this case, the width of the contour pattern 3 with respect to the fourth segment 44 may be measured. When the contour pattern 3 is returned to the first segment 41 after one cycle, the Operation S444 of measuring the widths of the contour pattern 3 may be completed.

In this way, measurement of the widths of the contour pattern 3 with respect to the first through fourth segments 41, 42, 43, and 44 may be completed. As a result, measurements of the widths, e.g., the width and the length, of the contour pattern 3 may be obtained. The measuring of the widths of the contour patterns may include measuring some of the plurality of segments and not measuring the other remaining segments.

Figure 9:
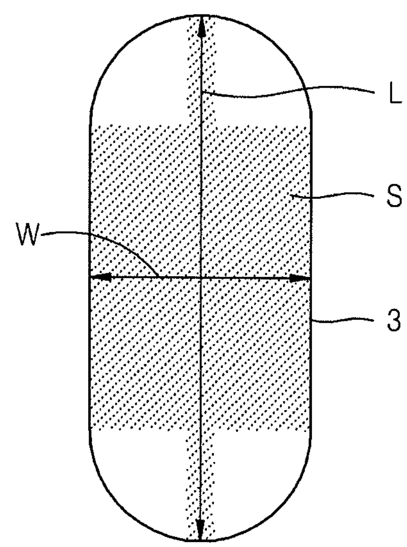

FIG. 9 illustrates the width W and the length L of the contour pattern 3 obtained by the above-described method. A shadow region S indicates a region where the width W and the length L of the contour pattern 3 are measured. The shadow region S may correspond to a region verified in the Operation S5, as illustrated in FIG. 2.

The method of forming a photomask according to the exemplary embodiments described above may be applied to all patterns having curved portions. For example, the method of forming a photomask according to the exemplary embodiments described above may be applied to various patterns, e.g., the line pattern a, the contact pattern b, the corner pattern c, and the slot pattern d, as illustrated in FIG. 1.

Figure 10:
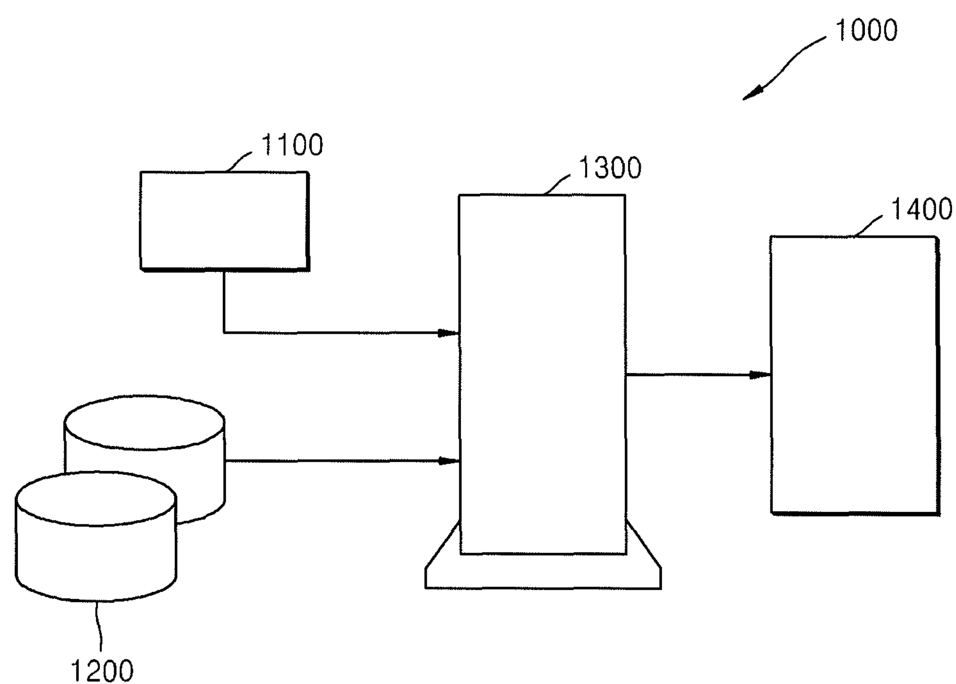
FIG. 10 illustrates a diagram of a system for performing a method of forming a photomask layout, according to an exemplary embodiment.

FIG. 10 illustrates a diagram of a system for performing a method of forming a photomask layout, according to an exemplary embodiment.

Referring to FIG. 10, a computer system 1300 for performing a method of forming a photomask, according to an exemplary embodiment, may be a general purpose computer or work station. The computer system 1300 may be of a stand-alone type or a network type. The computer system 1300 may include a single processor or a multiprocessor for executing operations. The computer system 1300 may be a parallel-processing computer system. The computer system 1300 may execute a sequence of executable instructions recorded in a program storing medium 1100, e.g., a compact disc (CD) or a digital video disk (DVD), or transmitted through a wireless/wired communication network such as the Internet. The computer system 1300 may be provided with a file containing information about a layout of design patterns from a layout file storage medium 1200, e.g., a database or another type of storage medium, and may execute an instruction for reading out the file.

The computer system 1300 may perform optical proximity correction (OPC), according to an exemplary embodiment, with respect to a layout so as to form a layout of correction patterns. The computer system 1300 may collect verification data about the layout of correction patterns by using a layout of contour patterns of the layout of correction patterns, and then form a file containing information about the processing. The computer system 1300 may check if a desired layout of design patterns is formed by verifying whether the layout of design patterns and the layout of correction patterns are substantially identical and/or identical to each other, by using the verification data, after which the layout may be transferred to a mask recording device 1400 by which a photomask or a reticle may be fabricated.

The system 1000 may include a providing mechanism configured to provide a layout of design patterns, a setting mechanism configured to set optical proximity correction (OPC) with respect to the layout of design patterns, a forming mechanism configured to form a layout of correction patterns with respect to the layout of design patterns by using the set OPC, a collecting mechanism configured to collect verification data about the layout of correction patterns by using a layout of contour patterns of the layout of correction patterns, and a verifying mechanism configured to verify whether the layout of design patterns and the layout of correction patterns are substantially identical and/or identical to each other, by using the verification data.

Embodiments may be embodied as a computer-readable code on a computer-readable recording medium. The recording medium may be all kinds of recording devices storing data that is readable by a computer. Examples of the recording medium include read-only memory (ROM), random access memory (RAM), CD-ROMs, magnetic tapes, floppy disks, optical data storage devices, and the like. The computer-readable recording medium can also be distributed over a network of coupled computer systems so that the computer-readable code is stored and executed in a decentralized fashion. The program or code may be stored in the storage medium is a series of instructions directly or indirectly used in a device having an information processing ability, such as a computer, in order to obtain a specific result. Accordingly, the term "computer", irrespective of the real use of the term, refers to any device including a memory, an input/output device, and a calculation device, and having an information processing ability to perform a specific function.

The storage medium may store programmed instructions for executing a method of forming a photomask on a computer. The method forming the photomask on the computer may include providing a layout of design patterns, setting optical proximity correction (OPC) with respect to the layout of design patterns, forming a layout of correction patterns with respect to the layout of design patterns by using the set OPC, collecting verification data about a layout of correction patterns by using a layout of contour patterns of the layout of correction patterns, and verifying whether the layout of design patterns and the layout of correction patterns are identical to each other, by using the verification data.

By way of summation and review, the scaling down of integrated circuits has accelerated due to the development of photolithography technology. However, the size of a pattern transferred onto a wafer may be smaller than a wavelength of an exposure beam. As a result, optical proximity correction (OPC) for compensating for light diffraction and interference phenomena has been recognized as a suggested process for fine and reliable micro-patterning. Thus, a reliable method of verifying patterns obtained by using the OPC process may be necessary.

Embodiments, e.g., the above exemplary embodiments, relate to a method of forming a photomask, and more particularly, to a method of forming a photomask by using a process of verifying a layout of optical-proximity-corrected design patterns for precisely foaming fine patterns.

The foregoing is illustrative of exemplary embodiments and is not to be construed as limiting thereof. Although specific terms are employed, they are used and are to be interpreted in a generic and descriptive sense only and not for purpose of limitation. Further, although exemplary embodiments have been described, those of ordinary skill in the art will readily appreciate that many modifications are possible in the exemplary embodiments without materially departing from the novel teachings and advantages of the exemplary embodiments. Accordingly, all such modifications are intended to be included within the scope of the claims. Accordingly, it will be understood by those of skill in the art that various changes in form and details may be made without departing from the spirit and scope of the present invention as set forth in the following claims.

What is claimed is:

1. A method of forming a photomask, the method comprising:

providing a layout of design patterns;

setting an optical proximity correction (OPC) with respect to the layout of design patterns;

forming a layout of correction patterns with respect to the layout of design patterns with the set OPC;

collecting verification data about the layout of correction patterns with a layout of contour patterns based on the layout of correction patterns, wherein collecting the verification data includes measuring widths of the contour patterns, and the measuring of the widths includes measuring a width of one selected contour pattern that is split into a plurality of segments having a predetermined size;

verifying whether the layout of design patterns and the layout of correction patterns are substantially identical to each other based on the verification data; and forming a photomask based on the layout of correction patterns.

2. The method as claimed in claim 1, wherein the collecting of the verification data includes:

extracting the layout of contour patterns from the layout of correction patterns;

selecting one contour pattern from the layout of contour patterns as the selected contour pattern;

splitting the selected contour pattern into the plurality of segments such that the plurality of segments have the predetermined size;

measuring the widths of the contour patterns to provide measured widths, the measuring of the widths of the contour patterns including measuring the width of the selected contour pattern with respect to the plurality of segments; and forming the verification data, the verification data including the measured widths of the contour patterns.

3. The method as claimed in claim 2, wherein the measuring of the widths of the contour patterns includes:

selecting one segment from the plurality of segments as a reference segment;

setting a gradient of a tangent line of the reference segment as a reference gradient;

calculating gradients of tangent lines of other segments of the plurality of segments based on the reference gradient; and measuring the width of at least the selected contour pattern with respect to ones of the plurality of segments according to the calculated gradients of the segments.

4. The method as claimed in claim 3, wherein the width of at least the selected contour pattern is measured with respect to the ones of the plurality of segments having the same absolute values of gradients as the reference gradient.

5. The method as claimed in claim 3, wherein the width of at least the selected contour pattern is measured with respect to a segment having a tangent line perpendicular to the tangent line of the reference segment.

6. The method as claimed in claim 3, wherein the width of at least the selected contour pattern is not measured with respect to the segments having different absolute values of gradients from the reference gradient.

7. The method as claimed in claim 3, wherein the width of at least the selected contour pattern is measured with respect to the plurality of segments sequentially in an order in which the plurality of segments are adjacent to the reference segment.

8. The method as claimed in claim 3, wherein the reference segment is positioned in a middle of the selected contour pattern.

9. The method as claimed in claim 3, wherein the segments having different gradients from the reference gradient are positioned on an end of the selected contour pattern.

10. The method as claimed in claim 1, further comprising, after the verifying whether the layout of design patterns and the layout of correction patterns are substantially identical to each other, forming the photomask by using the correction patterns if the layout of design patterns and the layout of correction patterns are substantially identical to each other.

11. The method as claimed in claim 1, wherein the verifying whether the layout of design patterns and the layout of correction patterns are substantially identical to each other is performed by comparing widths of patterns included in the layout of design patterns and widths of patterns included in the layout of correction patterns.

12. The method as claimed in claim 2, wherein the measuring of the widths of the contour patterns includes measuring some of the plurality of segments and not measuring other remaining segments.

13. The method as claimed in claim 2, wherein the measuring of the widths of the contour patterns includes:

splitting the plurality of segments into a first segment group and a second segment group;

performing measurement of the width of at least the selected contour pattern with respect to the first segment group; and omitting measurement of the width of at least the selected the contour pattern with respect to the second segment group.

14. The method as claimed in claim 13, wherein the plurality of segments are split into the first segment group and the second segment group according to their positions.

15. The method as claimed in claim 13, wherein the segments included in the first segment group are positioned in a middle of the selected contour pattern.

16. The method as claimed in claim 13, wherein some of the segments included in the first segment group are positioned at ends of the selected contour pattern.

17. The method as claimed in claim 13, wherein the segments included in the second segment group are positioned at ends of the selected contour pattern.

18. The method as claimed in claim 2, wherein the splitting the selected contour pattern included in the layout of the contour patterns into the plurality of segments is performed prior to the measuring of widths of the contour patterns, which in turn is performed prior to the forming the verification data.

19. A nontransistory computer-readable recording medium storing programmed instructions for executing a method of forming a photomask on a computer, the method comprising:

providing a layout of design patterns;

setting an optical proximity correction (OPC) with respect to the layout of design patterns;

forming a layout of correction patterns with respect to the layout of design patterns with the set OPC;

collecting verification data about the layout of correction patterns with a layout of contour patterns based on the layout of correction patterns, wherein collecting the verification data includes measuring widths of the contour patterns, and the measuring of the widths includes measuring a width of one selected contour pattern that is split into a plurality of segments having a predetermined size; and verifying whether the layout of design patterns and the layout of correction patterns are substantially identical to each other based on the verification data.

20. A method for verifying patterns for a photomask such that the photomask is formed with the patterns that have been verified, the method of verifying the patterns comprising:

collecting verification data about a layout of correction patterns with a layout of contour patterns based on the layout of correction patterns, wherein collecting the verification data includes measuring widths of the contour patterns, and the measuring of the widths includes measuring a width of one selected contour pattern that is split into a plurality of segments having a predetermined size; and verifying whether a layout of design patterns and the layout of correction patterns are substantially identical to each other based on the verification data.

* * * * *